United States Patent
Schlensker et al.

(10) Patent No.: US 9,377,129 B2
(45) Date of Patent: Jun. 28, 2016

(54) CONDENSATE DISCHARGE DEVICE FOR COMPRESSED GAS SYSTEMS

(75) Inventors: Herbert Schlensker, Leverkusen (DE); Johannes Sinstedten, Korschenbroich (DE)

(73) Assignee: BEKO TECHNOLOGIES GMBH, Neuss (DE)

( * ) Notice: Subject to any disclaimer, the term of this patent is extended or adjusted under 35 U.S.C. 154(b) by 88 days.

(21) Appl. No.: 14/119,987

(22) PCT Filed: Jun. 20, 2012

(86) PCT No.: PCT/EP2012/061858
§ 371 (c)(1),
(2), (4) Date: Jan. 20, 2014

(87) PCT Pub. No.: WO2012/175565
PCT Pub. Date: Dec. 27, 2012

(65) Prior Publication Data
US 2014/0130898 A1    May 15, 2014

(30) Foreign Application Priority Data
Jun. 20, 2011    (DE) .......................... 10 2011 051 201

(51) Int. Cl.
*F16T 1/00*    (2006.01)
*G05D 9/12*    (2006.01)
(Continued)

(52) U.S. Cl.
CPC . *F16K 51/00* (2013.01); *F16T 1/00* (2013.01); *F16T 1/14* (2013.01); *F16T 1/38* (2013.01);
(Continued)

(58) Field of Classification Search
CPC ................. F16T 1/00; F16T 1/38; F16T 1/14; F16K 51/00; Y10T 137/5907; Y10T 137/3052; Y10T 137/7316; Y10T 137/7306; Y10T 137/3003; Y10T 137/3105; Y10T 137/3077; G05D 9/12
USPC .......... 137/314, 187, 396, 392, 171, 204, 195
See application file for complete search history.

(56) References Cited

U.S. PATENT DOCUMENTS

| 956,030 | A | * | 4/1910 | Bennet .......................... 137/195 |
| 2,330,027 | A | * | 9/1943 | Churchman Russell C et al. ............................ 137/204 |

(Continued)

FOREIGN PATENT DOCUMENTS

| CN | 101169219 A | 4/2008 |
| DE | 4323004 A1 * | 3/1994 |

(Continued)

OTHER PUBLICATIONS

Raw machine translation of De 43 23 004 Al "Eimer" provided by the Epo (originally Published on Mar. 24, 1994).*

(Continued)

*Primary Examiner* — Craig Schneider
*Assistant Examiner* — David Colon Morales
(74) *Attorney, Agent, or Firm* — Cantor Colburn LLP

(57) ABSTRACT

The invention relates to a condensate discharge device for compressed gas systems, comprising a housing (21), which has a condensate collecting chamber (22) that can be connected to the compressed gas system by means of a condensate feed (23) and which has a condensate drain (24) that can be closed by means of valve assembly (25), and comprising a tubular body (32) protruding into the condensate collecting chamber (22) for accommodating at least one electronic filling level measuring device (31), by means of which the condensate filling level in the condensate collecting chamber (22) can be detected, wherein the housing (21) can be mounted in a first, vertical mounting position and a second, horizontal mounting position and the longitudinal axis of the tubular body (32) extends at an angle to the condensate feed direction (34).

8 Claims, 4 Drawing Sheets

(51) Int. Cl.
*F16K 51/00* (2006.01)
*F16T 1/14* (2006.01)
*F16T 1/38* (2006.01)

(52) U.S. Cl.
CPC ............. *G05D 9/12* (2013.01); *Y10T 137/3052* (2015.04); *Y10T 137/3077* (2015.04); *Y10T 137/3105* (2015.04); *Y10T 137/5907* (2015.04); *Y10T 137/7306* (2015.04)

(56) References Cited

U.S. PATENT DOCUMENTS

| | | | | |
|---|---|---|---|---|
| 2,871,874 | A * | 2/1959 | Coles Ralph V et al. | 137/392 |
| 2,884,131 | A * | 4/1959 | Mocarski Zenon R | 210/93 |
| 2,888,945 | A * | 6/1959 | Jacob Marlow | 137/392 |
| 3,131,335 | A * | 4/1964 | Berglund Carl 0 et al. | 361/178 |
| 3,419,034 | A * | 12/1968 | Hart Atlee S | 137/172 |
| 3,437,107 | A * | 4/1969 | Waseleski Joseph W, Jr | 137/392 |
| 3,547,145 | A * | 12/1970 | Holzer Walter | 137/392 |
| 3,905,385 | A * | 9/1975 | Green | 137/187 |
| 4,027,172 | A * | 5/1977 | Hamelink | 307/118 |
| 4,308,889 | A * | 1/1982 | Lin et al. | 137/187 |
| 4,336,821 | A * | 6/1982 | Frantz et al. | 137/187 |
| 4,494,692 | A * | 1/1985 | Dobias | 236/59 |
| 4,796,658 | A * | 1/1989 | Caple | 137/312 |
| 4,937,559 | A * | 6/1990 | Meacham et al. | 340/618 |
| 4,974,626 | A * | 12/1990 | Koch | 137/187 |
| 5,469,879 | A * | 11/1995 | Rasmussen | 137/187 |
| 5,484,522 | A * | 1/1996 | Entrekin | 210/86 |
| 5,548,944 | A * | 8/1996 | Prochut et al. | 53/511 |
| 6,206,025 | B1 * | 3/2001 | Koch et al. | 137/187 |
| 6,276,894 | B1 * | 8/2001 | Koch | 415/13 |
| 6,302,136 | B1 * | 10/2001 | Weaver et al. | 137/183 |
| 6,588,443 | B2 * | 7/2003 | Schlensker et al. | 137/2 |
| 2003/0116191 | A1 * | 6/2003 | Dobies et al. | 137/204 |

FOREIGN PATENT DOCUMENTS

| | | | |
|---|---|---|---|
| EP | 81826 A2 * | 6/1983 | |
| EP | 0391250 A2 | 10/1990 | |

OTHER PUBLICATIONS

Raw Machine Translation of Epo 0 081 826 A2 "Koch" provided by the Epo (originally Published on Jun. 22, 1983).*
Raw Machine Translation of Epo 0 391 250 A2 "Koch" provided by the Epo (originally Published on Oct. 10, 1990).*
CN Office Action issued Dec. 25, 2015 re: Application No. 2012800294983; pp. 1-10; citing: DE4323004A1, U.S. Pat. No. 3,905,385 A, U.S. Pat. No. 2,884,131 A, U.S. Pat. No. 5,484,522 A and CN101169219A.

* cited by examiner

CONDENSATE DISCHARGE DEVICE FOR COMPRESSED GAS SYSTEMS

TECHNICAL FIELD

The invention relates to a condensate discharge device for compressed gas systems, in particular compressed air systems.

BACKGROUND

Such condensate discharge devices are used for example in compressed air technology in order to remove the condensate usually arising in the pressure line network from the latter, which condensate can also contain oil or rust, apart from water. The condensates arise from the moisture in the surrounding air, which is sucked in by the compressed air compressor. The oil essentially originates from the compressors in which it is used as a lubricant, whereas the rust usually originates from the compressed air lines.

Various designs of condensate discharge devices are known. They usually work in such a way that a valve is opened, as a result of which the condensate is expelled from the compressed air network by the pressure. In this process, the gas or compressed air loss has to be kept as low as possible for reasons of efficiency in the operation of the compressed gas system.

Generic condensate discharge devices can essentially be split up into three groups depending on the nature of the control of the valve and of its energy supply.

So-called float-type discharge devices operate with a hollow body, which is raised by the buoyancy force of the liquid (condensate) collecting in a collecting chamber and thus actuates the valve. This valve opens a drainage opening of the collecting chamber, usually indirectly by means of a servo-control, through which drainage opening the condensate is pushed out. The condensate discharge devices constituted as float-type discharge devices find very widespread use on account of their ability to be produced at low cost, but they are also susceptible to malfunction.

Furthermore, condensate discharge devices with time-controlled solenoid valves, which are electrically actuated valves, are known. The latter open the valves at adjustable time intervals. A drawback is opening in the absence of condensate, as a result of which high energy losses are caused by discharged compressed air.

Finally, condensate discharge devices with electronically level-regulated valves, also referred to in the following as electronically level-regulated condensate discharge devices, detect a quantity of collecting liquid or condensate by means of an electronic sensor. When a specific quantity is reached, the valve is opened and precisely this quantity is discharged without additional compressed air losses. Condensate discharge devices of this type are relatively expensive in production, but on the other hand are characterized by a very cost-effective operation, for which reason considerable cost advantages can be achieved with the electronically level-regulated condensate discharge devices over their entire operating life.

An electronically level-regulated condensate discharge device is disclosed for example in EP 0 391 250 B1. This EP specification describes a device for discharging condensate from compressed gas systems, for example compressed air systems and suchlike, with a collecting chamber for condensate which is permanently connected to the compressed air system. Condensate, which collects in the collecting chamber of the condensate discharge device, is removed from the compressed air system at a drainage point, for example the lowest point of a conduit. Protruding into this collecting chamber is at least one electronic sensor, for example a capacitive sensor, which is disposed in a tubular body extending vertically in the collecting chamber and which detects the level of the condensate. In the described example of embodiment, two such sensors are preferably provided at different heights in the tubular body. When the collecting chamber is filled up to the height of the upper sensor, a discharge procedure begins. The electronics connected to the sensors open a valve assembly. The path for the condensate from the collecting chamber to a condensate drain thus becomes free. The valve assembly comprises for example a control valve in the form of a solenoid valve and a main or discharge valve in the form of a diaphragm valve controlled by said solenoid valve. In this way, the actuating forces and therefore the demands on the electronics are reduced. With the disclosed condensate discharge device, the control of the main valve takes place with the aid of clean compressed air, which is removed from a condensate-free protection zone in the collecting chamber of the condensate discharge device.

The location for the deployment of such condensate discharge devices in the compressed gas systems differs greatly, for example at lower connections of compressed air filters or compressed air reservoirs. The installation space for the condensate discharge device is often limited, for example by the ground clearance or the visibility of the control panel of the condensate discharge device. Since, however, the aforementioned condensate discharge devices can be mounted only in a specific mounting position, for example either only horizontal or only vertical, due for example to the establishment of the clean inner protection zone or the installation position of the sensor, recourse is taken to additional adapters or extensions or aids in cases in which a direct connection to the compressed gas system is not possible on account of the installation space.

BRIEF SUMMARY

Against this background, the present invention has set itself the task of providing a condensate discharge device for compressed gas systems, in particular compressed air systems, which offers a much wider scope of mounting options compared to previously known condensate discharge devices and therefore a much wider scope for possible uses and operating modes. The mounting should moreover be able to be carried out in a straightforward and cost-effective manner.

This problem is solved by a condensate discharge device for compressed gas systems, in particular compressed air systems.

According to the invention, the condensate discharge device for compressed gas systems, in particular compressed air systems, comprises a housing, which comprises a condensate collecting chamber, which can be connected to the compressed gas system by means of a condensate feed, and a condensate drain which can be closed by means of a valve assembly, and a tubular body protruding into the condensate collecting chamber for accommodating at least one filling level measuring device, by means of which the condensate filling level in the condensate collecting chamber can be detected. The housing of the condensate discharge device according to the invention can be mounted at least in a first, vertical mounting position and a second, horizontal mounting position, wherein the longitudinal axis of the tubular body runs obliquely with respect to the condensate feed direction.

In the sense of the present invention, the term "tubular body" should be broadly interpreted and generally describes an elongated hollow body, the length whereof is much greater than its diameter. The cross-sectional shape of the tubular body is not particularly prescribed or limited by the term "tubular body". Even though a circular cross-section is regarded as an optimum design for the most frequent cases of application, the cross-section can also have rectangular, oval or other shapes, for example to increase the rigidity.

The first, vertical and the second, horizontal mounting position of the condensate discharge device or its housing are understood to mean two mounting positions which differ from one another essentially by a rotation of the housing through approx. 90 degrees around an arbitrary spatial axis, i.e. a longitudinal, a transverse or a vertical axis of the condensate discharge device. Such a rotation around the vertical axis of the condensate discharge device, wherein a spatial axis parallel to the vertical direction is to be understood as the vertical axis of the condensate discharge device, can however be disregarded for the present invention, since the two mounting positions that can be obtained by a rotation around the vertical axis in this case have no effect on the position of the liquid or condensate level in the condensate collecting chamber. For the present invention, therefore, the mounting positions of importance are in particular those in which the position of the liquid or condensate level in the condensate collecting chamber changes, such as when the two mounting positions are obtained for example by a rotation around the longitudinal or transverse axis of the condensate discharge device. According to the invention, any arbitrary angle between 0 degrees (horizontal) and 90 degrees (vertical) can be adopted without functional restrictions on the condensate discharge device.

According to the invention, the longitudinal axis of the tubular body protruding into the condensate collecting chamber runs obliquely with respect to the condensate feed direction. Condensate feed direction is understood to mean the flow direction of the condensate running via the condensate feed into the condensate collecting chamber from the compressed gas system. Thus, the tubular body does not protrude vertically in either of the two first and second mounting positions, i.e. parallel to the vertical direction, in the condensate collecting chamber, but always forms with the vertical direction an angle greater than 0 degrees, preferably approx. ±45 degrees. A vertical direction is understood here to mean the spatial direction of the gravitational vector, such as is produced for example by a long plumb line. As a result of the special orientation of the tubular body and thus of the at least one filling level measuring device accommodated therein, the filling level of the condensate inside the condensate collecting chamber can always be reliably and accurately detected both in the first and in the second mounting position of the condensate discharge device. That is to say that the detection of the condensate filling level in the condensate collecting chamber can be carried out reliably independent of the actual, at least first and second mounting positions.

The range of options for the use and mounting of the condensate discharge device according to the invention is therefore generally much wider compared to condensate discharge devices according to the prior art. In particular, the condensate discharge device according to the invention permits at least one vertical and one horizontal mounting without design or structural modifications or suchlike having to be made to the condensate discharge device itself in respect of the choice of the actual mounting position. In at least the two mounting positions, an exact detection of the condensate filling level by means of the filling level measuring device accommodated in the oblique tubular body is always guaranteed on account of the oblique arrangement of the tubular body in the condensate collecting chamber. As a result of the wider range of mounting options for the condensate discharge device according to the invention, the cost of mounting as a whole can be reduced and mounting time and material saved.

An advantageous embodiment of the invention makes provision such that, as from a specific condensate filling level, a condensate-free hollow space in a connecting region of the tubular body with the condensate collecting chamber is constituted in the condensate collecting chamber during operation in at least the first and second mounting position by means of at least one barrier wall. This is understood to mean that the hollow space, although it is also present in itself when the condensate collecting chamber is empty, is constituted as a closed hollow space only in the presence of a rising condensate level. When the condensate inside the condensate collecting chamber reaches a specific filling level, in particular when the rising condensate level reaches the barrier wall, the hollow space becomes closed and thus remains in place and condensate-free even with a further rise in the condensate level. The hollow space is therefore always condensate-free and thus secure against contamination independently of the actual filling level of the condensate in the condensate collecting chamber and independently of the at least first and second mounting positions of the condensate discharge device.

Consequently, no condensate can pass into this hollow space, which is also referred to as a protection zone, and therefore no deposit of any particles possibly entrained in the condensate can form there. This thus prevents a continuous deposit from being formed from the outer wall of the tubular body accommodating the filling level measuring device towards the inner wall of the condensate collecting chamber. The filling level measuring device is thus protected, in particular against a measuring short circuit, which would greatly impair or prevent an accurate detection of the condensate filling level in the condensate collecting chamber. This applies especially in the case where the filling level measuring device is constituted by at least one capacitive sensor, wherein the capacitive sensor comprises an inner electrode disposed in the tubular body and an outer electrode constituted by the condensate collecting chamber or as an earthing pipe disposed in the condensate collecting chamber and the aforementioned condensate deposits can thus lead to a measuring short circuit between the inner electrode and the outer electrode of the filling level measuring device. Incorrect measurements due to undesired condensate deposits are thus prevented by the hollow space.

According to a further advantageous embodiment of the invention, the hollow space is closed off in an airtight manner by the barrier wall in the direction of the condensate feed and is open in the direction of the condensate drain. The airtight closure of the hollow space in the direction of the condensate feed prevents any further air from escaping from the hollow space as from a specific condensate level predefined by the barrier wall inside the condensate collecting chamber, since the condensate level in this state closes the opening of the hollow space on the condensate drainage side. Consequently, no condensate can penetrate into the hollow space when the condensate level rises further in the condensate collecting chamber. The opening of the hollow space in the direction of the condensate drain effectively prevents a continuous condensate deposit from forming between the outer wall of the tubular body and the inner wall of the condensate collecting chamber.

According to a further advantageous embodiment of the invention, the barrier wall has an L-shaped cross-sectional profile, wherein a first leg of the barrier wall is constituted normal to the condensate feed direction and a second leg of the barrier wall is constituted parallel to the condensate feed direction. As already mentioned, the condensate feed direction is understood to mean the flow direction of the condensate flowing via the condensate feed into the condensate collecting chamber from the compressed gas system. In a particularly straightforward embodiment, the barrier wall is able, by means of the first leg orientated normal to the condensate feed direction, to close the hollow space in an airtight manner in the direction of the condensate feed, whilst the second leg orientated parallel to the condensate feed direction specifies the condensate filling level in the condensate collecting chamber from which the condensate level closes the hollow space enclosed by the first leg, and consequently no further condensate can penetrate into the hollow space even with a further rise in the condensate level in the collecting chamber. The leg of the barrier wall constituted normal to the condensate feed direction can, if appropriate, be dispensed with, insofar as the leg of the barrier wall constituted parallel to the condensate feed direction is fitted to an inner wall of the condensate collecting chamber that runs normal to the condensate feed direction. The roof of the condensate collecting chamber, for example, can be used as such an inner wall of the condensate collecting chamber.

For maximum utilization of the volume made available by the condensate collecting chamber, a further advantageous embodiment of the invention makes provision such that the barrier wall is disposed in the condensate feed, in particular on an upper side of the condensate feed relative to the actual mounting position of the condensate discharge device. The volume of the condensate collecting chamber located below the barrier wall is thus completely available for collecting the condensate.

According to a further advantageous embodiment of the invention, the hollow space is bordered by the condensate collecting chamber in the regions in which it is not bordered by the barrier wall. Consequently, it is sufficient to provide the barrier wall only for the limitation of the condensate level in the condensate collecting chamber, but not for enclosing the entire condensate-free hollow space or the entire protection zone. The structure of the condensate discharge device according to the invention is thus simplified.

In a still further advantageous embodiment of the invention, the mouth of the condensate drain is disposed at a point in the condensate collecting chamber at which condensate is present during operation. This thus ensures that the condensate collected in the condensate collecting chamber can at all times be reliably drained irrespective of the actual, at least first and second mounting positions.

According to a further advantageous embodiment of the invention, the valve assembly comprises a control valve, in particular a solenoid valve, and a discharge valve, in particular a diaphragm valve, wherein it is possible with the control valve to build up or reduce an auxiliary pressure between the control valve and the discharge valve and the pressure medium for the auxiliary pressure can be withdrawn from the hollow space. In this way, the auxiliary pressure can be generated particularly efficiently for the control of the discharge valve, since the pressure medium in the hollow space is already under pressure due to the pressure of the compressed gas system. Furthermore, a constantly condensate-free pressure medium is available by means of the hollow space, so that the control valve is not contaminated or damaged by condensate deposits or solid components entrained in the condensate.

BRIEF DESCRIPTION OF THE DRAWINGS

Further advantageous details and effects of the invention are explained in greater detail below with the aid of an example of embodiment represented in the figures. In the figures.

DETAILED DESCRIPTION

In the various figures, identical parts are always provided with the same reference numbers, so that as a rule they are described only once.

Figure 1:
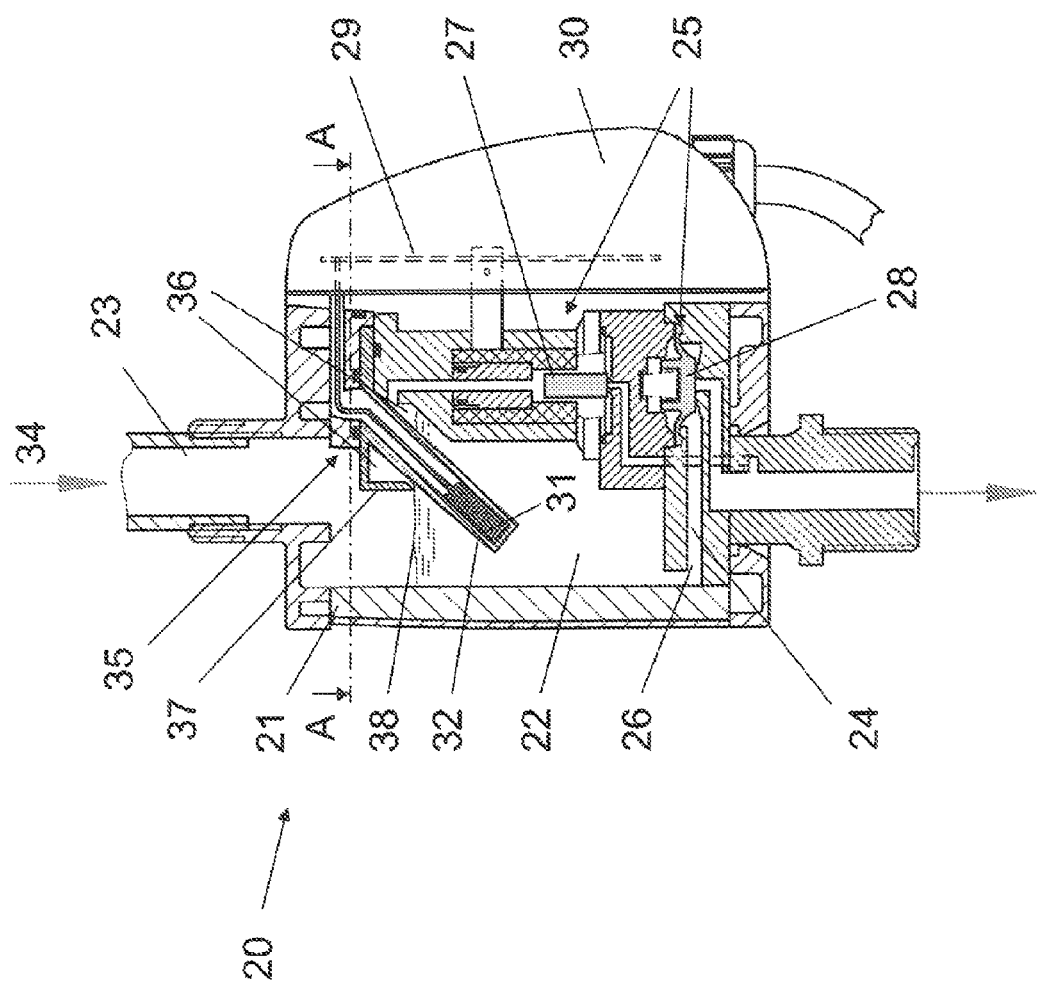
FIG. 1 shows a cross-sectional side view of an example of embodiment of a condensate discharge device according to the invention in a first, vertical mounting position.

FIG. 1 shows a cross-sectional side view of an example of embodiment of a condensate discharge device 20 according to the invention for compressed gas systems, in particular for compressed air systems, in a first, vertical mounting position. Condensate discharge device 20 comprises a housing 21, which comprises a condensate collecting chamber 22. Condensate collecting chamber 22 can be connected via a condensate feed 23 to the compressed gas system not represented in detail in FIG. 1. Condensate from the compressed gas system can flow via condensate feed 23 to condensate collecting chamber 22. The condensate passes out of condensate collecting chamber 22 again via a condensate drain 24. Condensate drain 24 can be closed by means of a valve assembly 25. As can be seen in FIG. 1, a mouth 26 of condensate drain 24 is disposed in a left-hand lower corner of condensate collecting chamber 22. As soon as condensate collects in condensate collecting chamber 22, the condensate is also present at mouth 26 during the operation of condensate discharge device 20 according to the invention in the first, vertical mounting position represented in FIG. 1, so that said condensate can pass into condensate drain 24 as soon as valve assembly 25 releases condensate drain 24.

In the example of embodiment represented, valve assembly 25 comprises a control valve 27, preferably a solenoid valve, and a discharge valve 28, preferably a diaphragm valve. Such a valve assembly 25 is known per se, for example from the initially mentioned EP specification. With the aid of solenoid valve 27, an auxiliary pressure is built up above the valve diaphragm of diaphragm valve 28 in condensate discharge device 20 represented in FIG. 1, in order to close diaphragm valve 28 and therefore condensate drain 24. In order to open diaphragm valve 28 and to discharge condensate, the auxiliary pressure is reduced by means of solenoid valve 27, so that the condensate under pressure in condensate collecting chamber 22 can open the valve diaphragm of diaphragm valve 28 and can thus flow away via condensate drain 24.

The control of solenoid valve 27 is assumed by a control electronics 29 indicated symbolically in FIG. 1, to which solenoid valve 27 is connected electrically. Control electronics 29 is located in a separate chamber 30 of housing 21, which is sealed off with respect to condensate. An electronic filling level measuring device 31 is also connected electrically to control electronics 29, as can also be seen in FIG. 1. Filling level measuring device 31 is accommodated in a tubular body 32 and, in the example of embodiment shown, comprises a capacitive sensor, which is also connected electrically to control electronics 29. By means of the capacitive sensor, control electronics 29 measures in a manner known per se the filling level of the condensate present in condensate collecting chamber 22. In the case of condensate discharge device 20 represented in FIG. 1, control electronics 29 is designed to measure the condensate filling level in condensate collecting chamber in a continuous or time-discrete manner, wherein the time-discrete measurements are however preferably carried out at time intervals of less than 100 ms in order thus to perform a quasi-continuous measurement. Furthermore, control electronics 29 is designed to control valve assembly 25 depending on the established condensate filling level, in such a way that it opens condensate drain 24 in the presence of a specified high filling level and thus initiates the discharge process of the condensate out of condensate collecting chamber 22 and closes condensate drain 24 again when a lower filling level is reached.

Control electronics 29 advantageously closes condensate drain 24 before condensate collecting chamber 22 is completely empty, in order thereby to prevent the unnecessary escape of compressed gas out of condensate discharge device 20. Consequently, condensate discharge device 20 level-regulated electronically in this manner enables a particularly economical, especially energy-efficient operation.

As can be seen from FIG. 1, tubular body 32, in the represented first, vertical mounting position, runs obliquely with respect to condensate feed direction 34. In particular, tubular body 32 extends from a right-hand upper point of condensate collecting chamber 22 downwards to the left. The right-hand upper point forms here a connecting region 35 of tubular body 32 to condensate collecting chamber 22. In this connecting region 35, a condensate-free hollow space 36 is constituted in condensate collecting chamber 22. In particular, hollow space 36 is always condensate-free and therefore secure against contamination irrespective of the actual filling level of the condensate in condensate collecting chamber 22 in the first, vertical mounting position of condensate discharge device 20 shown in FIG. 1. No condensate can therefore pass into hollow space 36, and therefore no deposit of any particles possibly entrained in the condensate can form there. This thus prevents a continuous deposit from being formed from the outer wall of tubular body 32 accommodating filling level measuring device 31 towards the inner wall of condensate collecting chamber 22. Filling level measuring device 31 is thus protected, in particular against a measuring short circuit, which would greatly impair or prevent an accurate detection of the condensate filling level in condensate collecting chamber 22.

FIG. 1 also shows a barrier wall 37, which closes out off hollow space 36 in an airtight manner in the direction of condensate feed 23 and leaves it open in the direction of condensate drain 24. The airtight closure of hollow space 36 in the direction of condensate feed 23 prevents air from escaping from hollow space 36 as from condensate level 38 drawn in FIG. 1, the height whereof is fixed by barrier wall 37. Condensate level 38 in this state closes the opening of hollow space 36 on the condensate drainage side. If the condensate level in condensate collecting chamber 22 rises above condensate level 38, condensate still cannot penetrate into hollow space 36. The opening of hollow space 36 on the condensate drainage side prevents a continuous condensate deposit from forming between the outer wall of tubular body 32 and the inner wall of condensate collecting chamber 22. As can also be seen in FIG. 1, barrier wall is connected only to tubular body 32 in the shown example of embodiment of condensate discharge device 20 according to the invention.

As can also be seen from FIG. 1, barrier wall 37 has an L-shaped cross-sectional profile, wherein a first leg of barrier wall 37 is constituted normal to condensate feed direction 34 and a second leg of the barrier wall parallel to condensate feed direction 34. The first leg orientated normal to condensate feed detonation 34 is used to close the hollow space in an airtight manner in the direction of condensate feed 23. The second leg orientated parallel to condensate feed direction 34, on the other hand, fixes the height of condensate level 38 in condensate collecting chamber 22 as from which hollow chamber 36 enclosed by the first leg is closed in an airtight manner. A further rise in the condensate level inside hollow space 36 is thus effectively prevented. The L-shaped cross-section permits a particularly straightforward and effective formation of barrier wall 37.

In the case of the example of embodiment of condensate discharge device 20 represented in FIG. 1, barrier wall 37 is disposed in condensate feed 23, in particular at the right-hand upper side of condensate feed 23. This enables maximum utilization of the volume made available by condensate collecting chamber 22 for the collection of condensate.

Hollow space 36 is bordered by condensate collecting chamber 22 in the regions in which hollow space 36 is not bordered by barrier wall 37, for example the lateral regions of barrier wall 37 lying in front of and behind the plane of the drawing in FIG. 1. It is therefore sufficient to provide barrier wall 37 solely for the limitation of the condensate level in condensate collecting chamber 22, but it is not required for the enclosure of entire condensate-free hollow space 36. Barrier wall 37 and condensate collecting chamber 22 thus close off entire hollow space 36. The structure of condensate discharge device 20 according to the invention is thus simplified.

Finally, it can be seen from FIG. 1 that pressure medium can advantageously be withdrawn from hollow space 36 in order to generate the auxiliary pressure made available via control valve 27. In this way, the auxiliary pressure can be generated in a particularly efficient manner for the control of discharge valve 28, since the pressure medium in hollow space 36 is already under pressure due to the pressure of the compressed gas system. Furthermore, a permanently condensate-free pressure medium is made available by hollow space 36, so that control valve 27 does not become contaminated or damaged by condensate deposits.

Figure 2:
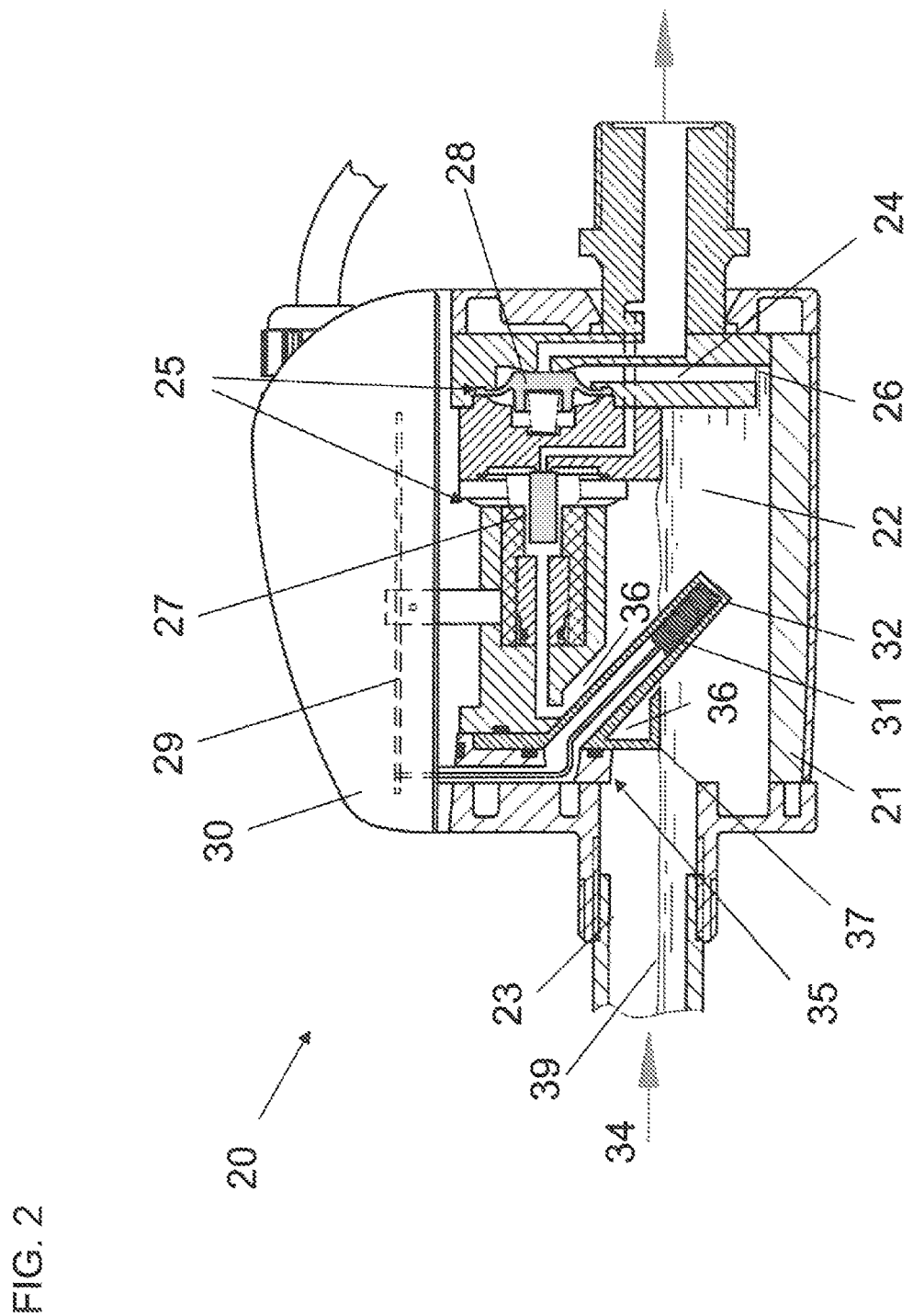
FIG. 2 shows a cross-sectional side view of the condensate discharge device according to the invention from FIG. 1 in a second, horizontal mounting position.

FIG. 2 represents a cross-sectional side view of the condensate discharge device according to the invention from FIG. 1 in a second, horizontal mounting position. The horizontal mounting position represented in FIG. 2 differs from the vertical mounting position represented in FIG. 1 in that condensate discharge device 20 according to the invention is rotated approx. 90 degrees around its transverse axis, i.e. the axis normal to the plane of the drawing. Condensate discharge device 20 represented in FIG. 2 does not otherwise comprise any changes compared to condensate discharge device 20 represented in FIG. 1.

FIG. 2 shows a condensate level 39 in condensate collecting chamber 22 as from which hollow space 36 enclosed by the first leg of barrier wall 37, which is orientated normal to condensate feed direction 34, is closed in an airtight manner. In the represented horizontal mounting position of condensate discharge device 20, the second leg of barrier wall 37 orientated parallel to condensate feed direction 34 is thus not required in the length shown in order to fix condensate level 39, but it is indeed required to fix condensate level 39 in the case of the vertical mounting position of condensate discharge device 20 represented in FIG. 1. A further rise in the condensate level inside hollow space 36 is in any event effectively prevented with the aid of barrier wall 37 also in the horizontal mounting position of condensate discharge device 20 according to the invention. The L-shaped cross-section permits a particularly simple and effective embodiment of barrier wall 37.

As has already been mentioned in connection with the description of FIG. 1, the arrangement of mouth 26 of condensate drain 24 in condensate collecting chamber 22 of condensate discharge device 20 according to the invention is selected such that, during operation of condensate discharge device 20, condensate can also collect at mouth 26 in the second, horizontal mounting position. As can be seen from FIG. 2, mouth 26 in the shown horizontal mounting position is located at a right-hand lower point of condensate collecting chamber 22, at which condensate is present during operation. The latter can thus pass into condensate drain 24 as soon as valve assembly 25 releases condensate drain 24.

Figure 3:
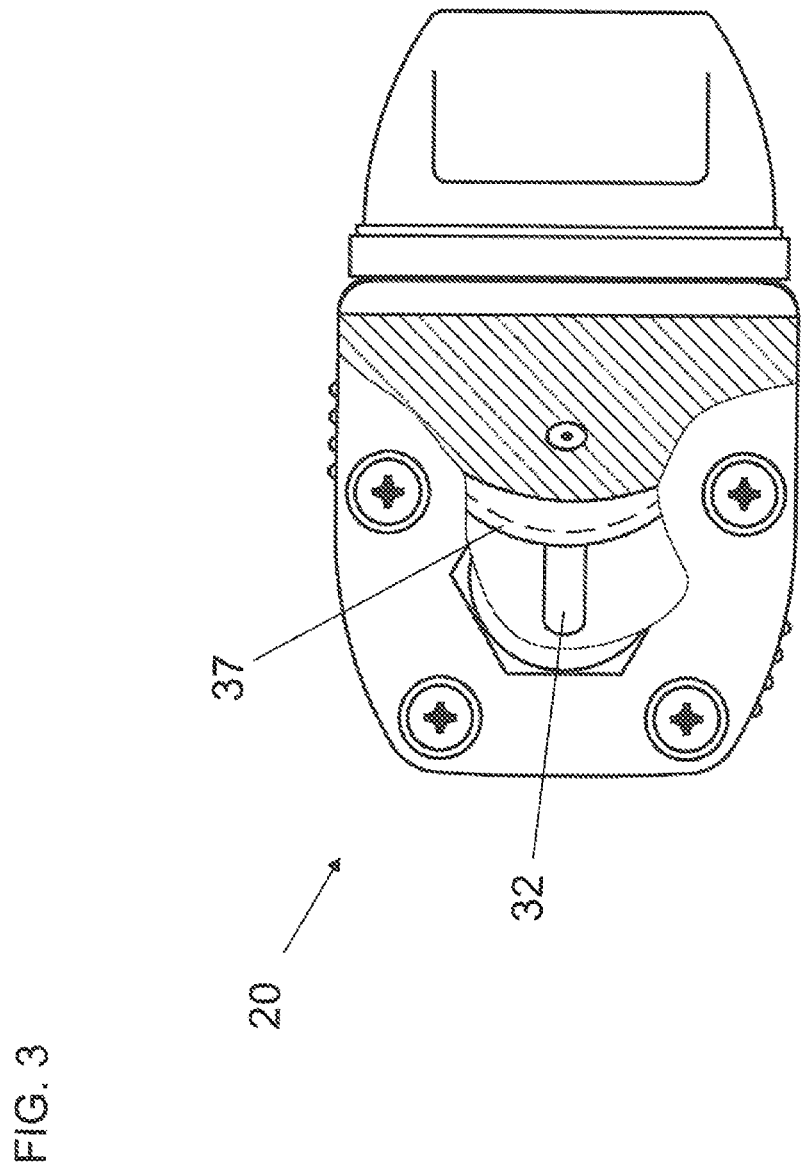
FIG. 3 shows a cross-sectional view through intersection line A-A shown in FIG. 1 to illustrate the course of the barrier wall.

FIG. 3 represents a cross-sectional view of condensate discharge device 20 through intersection line A-A shown in FIG. 1 to illustrate the course of the barrier wall. As can be seen from FIG. 3, barrier wall 37 encloses tubular body 32 in an approximately circular or elliptical shape in the represented example of embodiment of condensate discharge device 20. The broken line inside barrier wall 37 shown in FIG. 3 indicates the boundary of the second leg of L-shaped barrier wall 37 running below the plane of the drawing and extending parallel to condensate feed direction 34. In this way, the formation of hollow space 36 is ensured in the entire region around the entry of tubular body 32 and filling level measuring device 31 into condensate collecting chamber 22.

Figure 4:
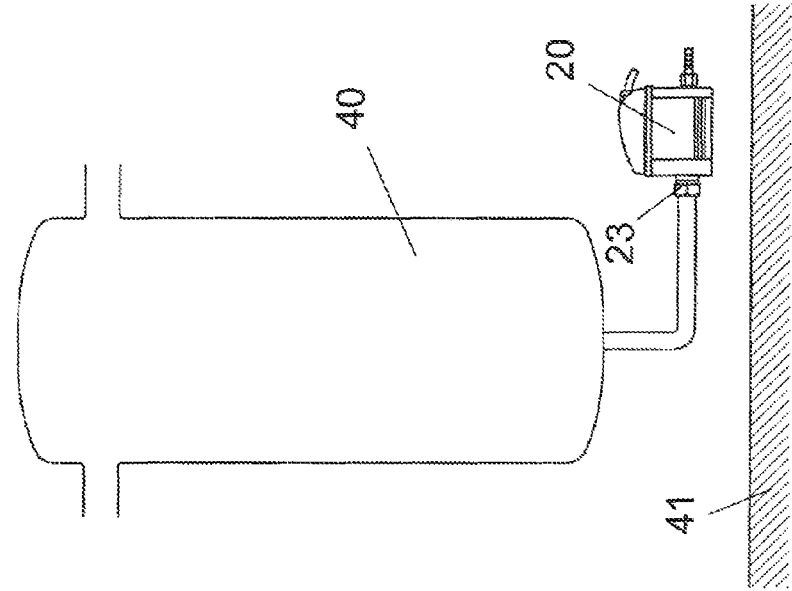
FIG. 4 shows a first example of use of the condensate discharge device according to the invention from FIG. 1 in the first, vertical mounting position
Figure 5:
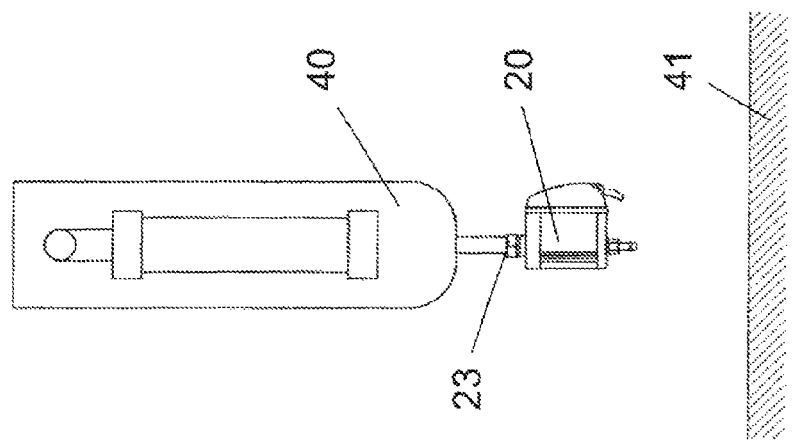
FIG. 5 shows a second example of use of a condensate discharge device according to the invention from FIG. 1 in the second, horizontal mounting position.

FIGS. 4 and 5 respectively represent an example of a first and second use of the condensate discharge device according to the invention from FIG. 1 in the first, vertical mounting position and in the second, horizontal mounting position. In FIG. 4, condensate discharge device 20 according to the invention is disposed in a vertical mounting position and is connected to a symbolically represented compressed gas system 40, in particular a compressed air system, via condensate feed 23. Since, as can be seen in FIG. 1, a sufficient distance is present between a lower side of the compressed gas system, to which condensate discharge device 20 is advantageously connected, and floor 41, vertical mounting of condensate discharge device 20 according to the invention is in this case the most straightforward mounting option.

FIG. 5, on the other hand, represents the case of application in which a sufficient distance does not remain between a connection side of compressed gas system 40 and floor 41. In this case, however, condensate discharge device 20 according to the invention can advantageously be mounted horizontally, so that the available mounting space can still be used to the optimum effect. Additional adapters, extensions or auxiliary lines for the connection of condensate discharge device 20 are in the main no longer necessary on account of its wider range of mounting options, so that the cost of mounting can be reduced as a whole with condensate discharge device 20 according to the invention and mounting time and material can be saved.

The condensate discharge device according to the invention has been explained in greater detail with the aid of an example of embodiment represented in the figures. The condensate discharge device is not however limited to the embodiments described herein, but also includes identically acting further embodiments. Although the condensate discharge device has been shown only in a vertical and a horizontal mounting position in the figures, it can also be mounted at any arbitrary angle between 0 degrees (horizontal) and 90 degrees (vertical), i.e. in an arbitrary mounting position between the first, vertical and the second, horizontal mounting position, without functional restrictions on the condensate discharge device.

In a preferred embodiment, the condensate discharge device according to the invention is used for the discharge of condensate from compressed gas systems, in particular compressed air systems, wherein the condensate is preferably expelled by means of an electronically level-regulated valve assembly of the condensate discharge device according to the invention as described herein.

The invention claimed is:

1. A condensate discharge device with a housing, which comprises
   a condensate collecting chamber, connected to a compressed gas system by means of a condensate feed, and a condensate drain which is closed by means of a valve assembly,
   a tubular body protruding into the condensate collecting chamber for accommodating at least one electronic filling level measuring device, by means of which a condensate filling level in the condensate collecting chamber is detected,
   wherein the housing is mounted in at least a first, vertical mounting position and a second, horizontal mounting position and a longitudinal axis of the tubular body runs obliquely with respect to a condensate feed direction,
   wherein, as from a specific condensate filling level, a condensate-free hollow space in a connecting region of the tubular body with the condensate collecting chamber is constituted in the condensate collecting chamber during operation in at least the first and second mounting position by means of at least one barrier wall.

2. The condensate discharge device according to claim 1, wherein the housing is mounted at any arbitrary angle between the first, vertical mounting position and the second, horizontal mounting position.

3. The condensate discharge device according to claim 1, wherein the hollow space, as from the specific condensate filling level, is closed off in an airtight manner by the barrier wall in the direction of the condensate feed and is open in the direction of the condensate drain.

4. The condensate discharge device according to claim 1, wherein the barrier wall has an L-shaped cross-sectional profile, wherein a first leg of the barrier wall is constituted normal to the condensate feed direction and a second leg of the barrier wall is constituted parallel to the condensate feed direction.

5. The condensate discharge device according to claim 1, wherein the barrier wall is disposed adjacent an upper side of the condensate feed.

6. The condensate discharge device according to claim 1, wherein the hollow space is bordered by the condensate collecting chamber in the regions in which the hollow space is not bordered by the barrier wall.

7. The condensate discharge device according to claim 1, wherein a mouth of the condensate drain is disposed at a point in the condensate collecting chamber at which condensate is present during operation.

8. The condensate discharge device according to claim 1, wherein the valve assembly comprises a control valve and a discharge valve where the control valve builds up and reduces an auxiliary pressure between the control valve and the discharge valve and the pressure medium for the auxiliary pressure is withdrawn from the hollow space.

\* \* \* \* \*